(12) United States Patent
Shetty et al.

(10) Patent No.: US 12,088,585 B2
(45) Date of Patent: Sep. 10, 2024

(54) VOICE SKILL SESSION LIFETIME MANAGEMENT

(71) Applicant: VMware LLC, Palo Alto, CA (US)

(72) Inventors: Rohit Pradeep Shetty, Bangalore (IN); Suman Aluvala, Bangalore (IN)

(73) Assignee: VMware LLC, Palo Alto, CA (US)

( * ) Notice: Subject to any disclaimer, the term of this patent is extended or adjusted under 35 U.S.C. 154(b) by 111 days.

(21) Appl. No.: 16/801,197

(22) Filed: Feb. 26, 2020

(65) Prior Publication Data

US 2021/0211422 A1    Jul. 8, 2021

(30) Foreign Application Priority Data

Jan. 6, 2020  (IN) .............................. 202041000478

(51) Int. Cl.
*H04L 9/40* (2022.01)
*G10L 17/00* (2013.01)
*H04L 9/08* (2006.01)
*H04L 9/32* (2006.01)

(52) U.S. Cl.
CPC .......... *H04L 63/0861* (2013.01); *G10L 17/00* (2013.01); *H04L 9/085* (2013.01); *H04L 9/3231* (2013.01)

(58) Field of Classification Search
CPC ..... G10L 17/00; H04L 63/0861; H04L 9/085; H04L 9/3231; H04L 63/0435; H04L 63/067; H04L 63/102; G06F 3/167
See application file for complete search history.

(56) References Cited

U.S. PATENT DOCUMENTS

| | | | |
|---|---|---|---|
| 8,989,779 B1 * | 3/2015 | Centore, III | H04W 4/021 455/456.2 |
| 9,286,899 B1 | 3/2016 | Narayanan | |
| 9,928,839 B1 | 3/2018 | Lester et al. | |
| 9,942,222 B1 * | 4/2018 | Fenton | H04L 63/0853 |
| 10,063,542 B1 | 8/2018 | Kao | |
| 10,404,678 B2 | 9/2019 | Grajek et al. | |
| 10,524,092 B2 | 12/2019 | Gandhi et al. | |
| 10,719,591 B1 | 7/2020 | Krieger et al. | |
| 10,748,546 B2 | 8/2020 | Kim et al. | |
| 10,770,092 B1 | 9/2020 | Adams et al. | |

(Continued)

FOREIGN PATENT DOCUMENTS

| | | |
|---|---|---|
| WO | 2016141972 A1 | 9/2016 |
| WO | 2017131267 A1 | 8/2017 |

OTHER PUBLICATIONS iMore.com, "What will happen if I delete a device from my iCloud account?" https://forums.imore.com/icloud/345348-what-will-happen-if-i-delete-device-my-icloud-account-html, Oct. 18, 2015 (Year: 2015).

(Continued)

*Primary Examiner* — Daniel B Potratz
*Assistant Examiner* — Matthias Habtegeorgis
(74) *Attorney, Agent, or Firm* — Kim & Stewart LLP

(57) ABSTRACT

Disclosed are various aspects of voice skill session lifetime management. In some examples, a session extension request is received. The session extension request extends a voice skill session of a voice-activated device. A personal client device is identified based on the session extension request. A command to emit an ultrasonic pulse is transmitted to the personal client device.

20 Claims, 5 Drawing Sheets

(56) References Cited

U.S. PATENT DOCUMENTS

| | | | |
|---|---|---|---|
| 10,832,310 B2 | 11/2020 | Isaacson et al. | |
| 10,877,718 B2 | 12/2020 | Gosu et al. | |
| 10,951,652 B1* | 3/2021 | Sharifi Mehr | H04L 63/0807 |
| 11,070,949 B2 | 7/2021 | Gross et al. | |
| 2002/0076004 A1 | 6/2002 | Brockenbrough et al. | |
| 2004/0199538 A1* | 10/2004 | Matsuda | H04L 41/0273 |
| | | | 707/999.102 |
| 2008/0021997 A1 | 1/2008 | Hinton | |
| 2008/0144944 A1* | 6/2008 | Breed | G06V 40/103 |
| | | | 382/224 |
| 2009/0034702 A1* | 2/2009 | Cai | H04M 15/83 |
| | | | 379/114.2 |
| 2010/0031329 A1 | 2/2010 | Kim et al. | |
| 2011/0307790 A1* | 12/2011 | Pandya | H04L 12/1403 |
| | | | 709/206 |
| 2013/0156194 A1 | 6/2013 | Tanioka | |
| 2013/0179692 A1 | 7/2013 | Tolba et al. | |
| 2014/0200893 A1 | 7/2014 | Vanjani | |
| 2014/0258392 A1* | 9/2014 | Barth | H04W 12/08 |
| | | | 709/204 |
| 2014/0281547 A1 | 9/2014 | Modzelewski et al. | |
| 2015/0082427 A1 | 3/2015 | Ivanchykhin et al. | |
| 2015/0195406 A1 | 7/2015 | Dwyer et al. | |
| 2015/0244472 A1* | 8/2015 | Poppe | H04B 11/00 |
| | | | 367/135 |
| 2016/0119323 A1 | 4/2016 | Krishna | |
| 2016/0224548 A1 | 8/2016 | Massand | |
| 2016/0373490 A1 | 12/2016 | Sedar et al. | |
| 2017/0006044 A1* | 1/2017 | Ezra | H04L 67/145 |
| 2017/0093735 A1* | 3/2017 | Backholm | H04W 4/80 |
| 2017/0126640 A1 | 5/2017 | Vincent et al. | |
| 2017/0223613 A1 | 8/2017 | Wang et al. | |
| 2017/0329573 A1 | 11/2017 | Mixter | |
| 2017/0345105 A1 | 11/2017 | Isaacson et al. | |
| 2017/0346949 A1 | 11/2017 | Sanghavi et al. | |
| 2018/0007060 A1 | 1/2018 | Leblang et al. | |
| 2018/0122378 A1* | 5/2018 | Mixter | H04L 67/306 |
| 2018/0137267 A1 | 5/2018 | Krieger et al. | |
| 2018/0176270 A1* | 6/2018 | Griffin | H04L 67/52 |
| 2018/0199156 A1 | 7/2018 | Gandhi et al. | |
| 2018/0204187 A1 | 7/2018 | Stewart et al. | |
| 2019/0007381 A1 | 1/2019 | Isaacson et al. | |
| 2019/0116264 A1 | 4/2019 | Sanghavi et al. | |
| 2019/0132321 A1 | 5/2019 | Pitchaimani | |
| 2019/0163896 A1 | 5/2019 | Balaraman et al. | |
| 2019/0306137 A1 | 10/2019 | Isaacson et al. | |
| 2019/0318002 A1 | 10/2019 | Sharma et al. | |
| 2019/0339927 A1 | 11/2019 | Gosu et al. | |
| 2019/0361671 A1 | 11/2019 | Maltsev et al. | |
| 2019/0377898 A1* | 12/2019 | Dunjic | G06F 21/32 |
| 2020/0084205 A1 | 3/2020 | Bulpin | |
| 2020/0120088 A1 | 4/2020 | Jain et al. | |
| 2020/0134211 A1 | 4/2020 | Miller et al. | |
| 2020/0137053 A1 | 4/2020 | Bhaya et al. | |
| 2020/0228521 A1* | 7/2020 | Edwards | H04L 63/0853 |
| 2020/0349935 A1 | 11/2020 | Smith et al. | |
| 2020/0389314 A1 | 12/2020 | Kunnath et al. | |
| 2021/0058517 A1* | 2/2021 | Serbajlo | H04L 12/1822 |
| 2021/0072951 A1 | 3/2021 | Gosu et al. | |
| 2021/0082397 A1* | 3/2021 | Kennewick | G10L 15/22 |
| 2021/0083996 A1* | 3/2021 | Moon | H04L 51/046 |
| 2021/0119794 A1 | 4/2021 | Shpurov et al. | |
| 2021/0176229 A1 | 6/2021 | Xuan et al. | |
| 2021/0306329 A1 | 9/2021 | Conley et al. | |
| 2021/0409955 A1 | 12/2021 | Stuntebeck et al. | |
| 2022/0237273 A1 | 7/2022 | Krieger et al. | |
| 2022/0329431 A1* | 10/2022 | Shpurov | H04L 9/3213 |
| 2022/0361265 A1* | 11/2022 | Alexander | H04W 12/63 |

OTHER PUBLICATIONS

Klein, "How to Remove Devices from Your iCloud Account" https://www.howtogeek.com/240710/how-to-remove-devices-from-your-icloud-account/, Jul. 11, 2017 (Year: 2017).

* cited by examiner

VOICE SKILL SESSION LIFETIME MANAGEMENT

CROSS-REFERENCE TO RELATED APPLICATIONS

This application is related to U.S. patent application Ser. No. 16/785,682, filed on Feb. 10, 2020 and entitled SINGLE SIGN-ON SERVICE AUTHENTICATION THROUGH A VOICE ASSISTANT. This application is related to U.S. patent application Ser. No. 16/799,867, filed on Feb. 25, 2020 and entitled SERVICE AUTHENTICATION THROUGH A VOICE ASSISTANT. This application is related to U.S. patent application Ser. No. 16/794,265, filed on Feb. 19, 2020 and entitled DATA LEAK PREVENTION USING USER AND DEVICE CONTEXTS. This application is related to U.S. patent application Ser. No. 16/801,176, filed on Feb. 26, 2020 and entitled SKILL REDIRECTIONS IN A VOICE ASSISTANT All of the above-referenced applications are incorporated herein by reference in their entireties.

RELATED APPLICATIONS

Benefit is claimed under 35 U.S.C. 119(a)-(d) to Foreign Application Serial No. 202041000478 filed in India entitled "VOICE SKILL SESSION LIFETIME MANAGEMENT", on Jan. 6, 2020, by VMWARE, Inc., which is herein incorporated in its entirety by reference for all purposes.

BACKGROUND

In an enterprise setting, individuals can utilize a number of different services and applications in order to complete tasks or actions of an enterprise workflow. These services can be managed through a workflow service that maintains a record of devices and users for the enterprise. Some devices used for enterprise workflows are activated using voice commands. Enterprises can require user or device authentication in order to ensure the security of enterprise data and accounts that are accessed by voice-activated devices and other devices.

Authentication of voice-activated devices can be problematic, particularly when the device lacks a touchscreen, keyboard, or other input/output devices. For example, an authentication sequence can include entering credentials through another device, or a lengthy voice authentication sequence. When a user logs out of the voice-activated device or the authenticated session ends, the device will have to re-authenticate with the workflow service. Cumbersome authentication processes can impede workflows and frustrate users that may otherwise prefer to utilize voice-activated devices. Accordingly, traditional methods can be ineffective for maintaining security while facilitating natural use of voice-activated devices in an enterprise setting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to voice skill session lifetime management. For example, a workflow service can manage enterprise workflows using network services and other enterprise back ends. A user can implement voice skills, or voice-activated applications on a voice-activated device, in order to perform enterprise workflows. Authentication to establish an authenticated voice skill session on the voice-activated devices can be cumbersome. A user may be prompted to enter account credentials through another device, or perform a lengthy voice authentication sequence. When a user logs out of the voice skill session or the authenticated session ends, the device will have to re-authenticate with the workflow service. Voice skills, or the authenticated voice skill sessions can be terminated after the user is silent for a certain period of time. This security measure helps to maintain security if users forget to log out of voice-activated devices. When performing enterprise tasks, a user may prefer to think carefully or otherwise remain silent for a time. This silent time can cause the voice skill or voice skill session to end, and the authentication process will have to be repeated. However, the present disclosure describes a more effective solution to securely maintain an authenticated voice skill session for enterprise workflows.

Figure 1:
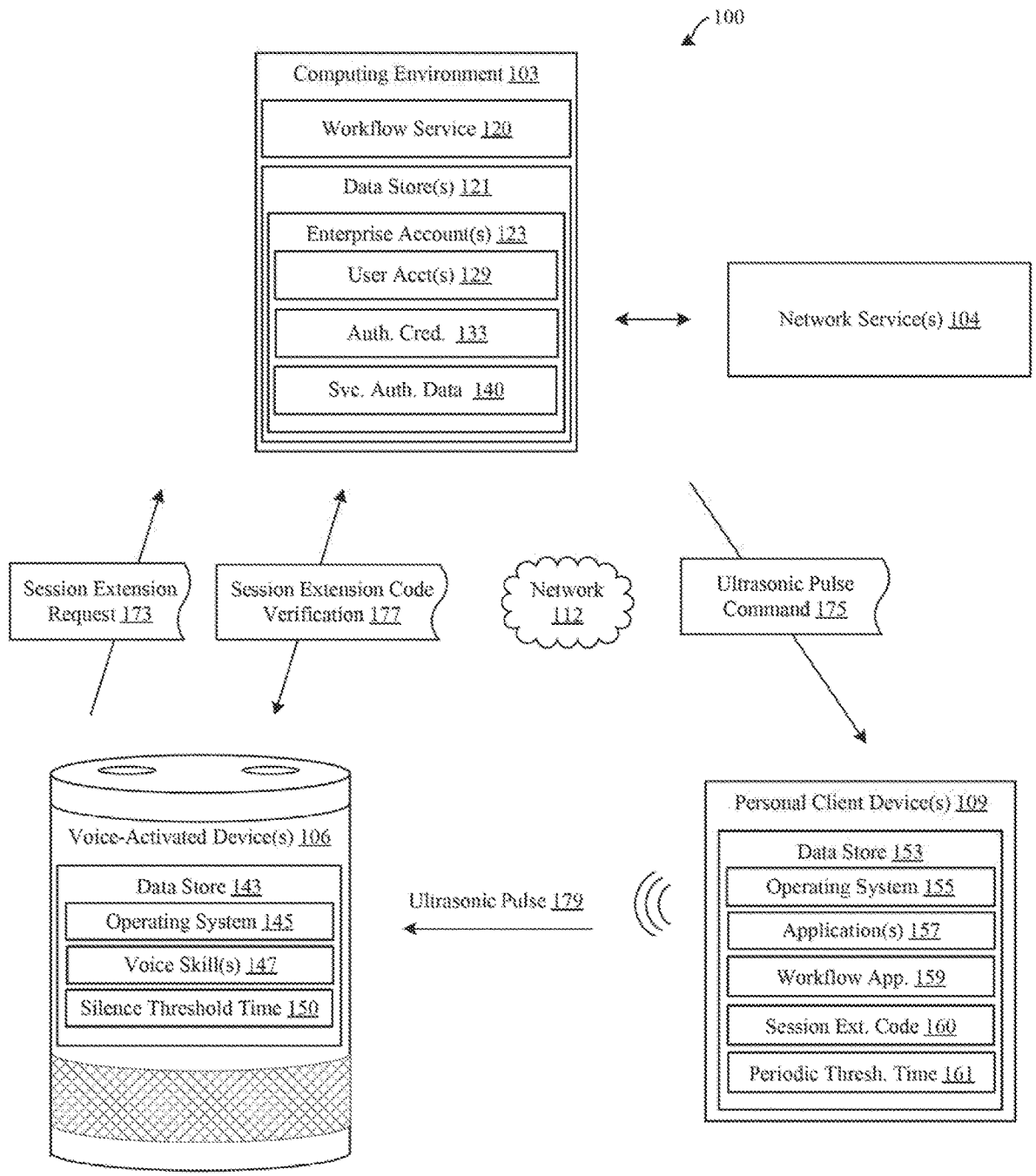
FIG. 1 is a drawing of an example of a networked environment including a workflow service, voice-activated device, a personal client device, and other components in communication through a network.

With reference to FIG. 1, shown is an example of a networked environment 100. The networked environment 100 can include a computing environment 103 executing a workflow service 120, network services 104, voice-activated devices 106, and personal client devices 109, in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the workflow service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a workflow service 120 as well as other applications, services, processes, systems, engines, or functionality not discussed in detail herein. The workflow service 120 can be stored in the data store 121 of the computing environment 103.

The workflow service 120 can be utilized by one or more enterprises. In some embodiments, the workflow service can be part of a local network, trusted network, or intranet, which can be separate from the other components of the networked environment 103. In some cases, the identity manager service can be part of the computing environment 103. In other cases, the identity manager service can be separate from the computing environment 103.

The workflow service 120 can manage enterprise workflows performed by users of the personal client devices 109. The workflow service 120 can also manage authentication with network services 104 that are utilized as backend services for the workflows. The workflow service 120 can monitor one or more network services 104 that a user is authorized to access. For example, the workflow service 120 can periodically query a network service 104 for notifications, updates, messages, changes, actions to be performed, or other events. If a notification, update, message, change, action to be performed, or other event is identified, the workflow service 120 can then notify the user. For example, the workflow service 120 can send a message to the voice-activated device 106, the personal client device 109, or another client device to notify the user. The operating system 145 of the voice-activated device 109 and the operating system 155 of the personal client device 109 can include a notification framework that provides a notification for the message. In the voice-activated device 109, such as a voice assistant device without a display, a notification can include a sound generated using an audio device. In the personal client device 109, the notification can include a sound, a visual notification using an LED or a display device, and/or haptic feedback using a haptic device.

The workflow service 120 can include authentication functionality, which can include retrieving, caching or storing service authentication data 140 provided by various network services 104. The service authentication data 140 can be used to query the network services 104 for information. In some embodiments, use of the workflow service 120 can be invisible to the user. In other embodiments, the user may be asked to opt-in to the use of authentication services of the workflow service 120, or the identity manager through a web-portal, or other user interface. Such a web-portal or other user interface can be provided, for example, by the workflow service 120 or the identity manager.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include memory of the computing environment 103, mass storage resources of the computing environment 103, or any other storage resources on which data can be stored by the computing environment 103. The data stored in the data store 121 can include, for example, a number of enterprise accounts 123, each of which can be associated with user accounts 129, service authentication data, and other data. The data stored in the data store 121 can be associated with the operation of the various applications and/or functional entities described.

The user accounts 129 can be associated with specific subsets of service authentication data and other authentication data. A user account 129 can include one or more authentication credentials 133, such as the single sign-on tokens, as well as stored or cached access tokens, refresh tokens, and others. Other information about the user can also be stored as part of the user account 129, such as the user's name, email address, contact information, enterprise responsibilities, and personal client devices 109. The responsibilities can include responsibilities to perform particular actions 136 or types of actions 136 for the enterprise.

A user account 129 can also include access permissions that indicate computing resources that the user account is authorized to access. For example, the access permissions can indicate that a user account is permitted to access some network services 104 but is prohibited from accessing other network services 104. As another example, the access permissions can indicate that the user account 129 is allowed to access certain features of a network service 104, but prohibited from accessing other features. For example, if one of the network services 104 that a user was permitted to access was a customer relationship management (CRM) service, the user might have permission to access his or her own contacts but be prohibited from accessing the sales contacts of other users.

The user account 129 can identify device data for associated personal client devices 109. Device data can include one or more of a device identifier, a unique device identifier (UDID), a media access control (MAC) address, an internet protocol (IP) address, or another identifier that uniquely identifies a device with respect to other devices. The device data can include device specifications, and a type of each personal client device 109. Specifications for the personal client device 109 can include a hardware configuration that specifies a chipset identifier, a video card identifier, a memory identifier, a monitor or screen identifier, an input device identifier, and a peripheral identifier for each peripheral utilized by the personal client device 109. Specifications for the personal client device 109 can include a software configuration that specifies an application identifier for each application installed on the personal client device 109, a driver or driver version for the hardware device and peripheral of the personal client device 109, an operating system 155 or operating system version installed on the personal client device 109, and other information. Certain personal client devices 109 can be flagged or pre-selected for use to extend voice skill sessions. The user account 129 can also include an organizational group of the user account 129 or the personal client device 109.

The identity manager can authenticate users and manage user authorizations or permissions to access network services 104, applications, data, or other computing resources. For example, the identity manager could correspond to a single sign-on portal that verifies a user's authentication credentials 133, issue a single sign-on token that identifies the user, and verifies whether the user has the appropriate access permissions to access one or more network services 104. Examples of identity managers include AMAZON's AWS Identity and Access Management (IAM) service, VMWARE's Identity Manager, or MICROSOFT's Active Directory Federation Services.

A network service 104 can include a web application, web service, or other network facing application. The network service 104 can be federated or associated with a shared identity manager so each can be accessed using the identity manager. One or more network services 104 can be provided by the same provider or by different providers. The service authentication data 140 can include information that guides authentication with network services 104. For example, API keys, access tokens, refresh tokens, cryptographic certificates, and other network service credentials for a network service 104. The workflow service 120 can also store network endpoints or addresses associated with particular functionalities provided by a network service 104. The service authentication data 140 can also include a process or set of steps that the workflow service 120 can perform to authenticate with a network service 104 on behalf of a user or device. The workflow service 120 can submit an authentication request to the network service 104. Once authenticated, the network service 104 can provide network service credentials and other authentication data 140 to the workflow service 120. The workflow service 120 can store or cache the authentication data 140 to use on behalf of a user.

The voice-activated device 106 can be representative of one or more voice-activated devices 106. The voice-activated device 106 can include a processor-based system, such as a computer system, that can include a voice-activated smart device, a voice assistant, a speaker device, a headphone device or other wearable device, or any other device with capability to produce and detect sounds. The voice-activated device 106 can encompass devices including mobile devices designed to be kept on a user, as well as stationary devices and permanent electronic fixtures of a building or another object. The voice-activated device 106 can have an operating system 145 that can perform functionalities and execute applications. The operating system 145 can be stored in a data store 143 that also includes voice skills 147, a silence threshold time 150, and other data. The voice-activated device 106 can execute the workflow application 159 to perform or access the functionality described for the workflow service 120. In some cases, the functionalities described with respect to the workflow application 159 can be performed by the voice skill 147.

The voice skill 147 can include a voice-activated application that can perform workflow actions and tasks in conjunction with the workflow service 120 and a network service 104. The voice-activated device 106 can be equipped with networking capability or networking interfaces, including a localized networking or communication capability, such as a near-field communication (NFC) capability, radio-frequency identification (RFID) read or write capability, or other localized communication capability. A voice-activated device 106 can include devices that lack or omit a screen or display device.

The voice skill 147 can send a voice-skill-session extension request 173 to the workflow service 120. The voice skill 147 can monitor audio that is detected by a microphone or audio input device of the voice-activated device 106 and forwarded to the voice skill 147. The voice skill 147 can track silent or quiet periods, and can transmit the session extension request 173 once the silence threshold time 150 is reached.

The workflow service 120 can identify an appropriate personal client device 109 for a user that has authenticated the voice skill 147 on the voice-activated device 106. The workflow service 120 can send an ultrasonic pulse command 175 to the personal client device 109. The ultrasonic pulse command 175 can also be referred to as a session extension pulse command 175. The personal client device 109 can emit the ultrasonic pulse 179 to extend the session. The ultrasonic pulse 179 can include a session extension code 160. The voice-activated device 106 can detect the ultrasonic pulse 179 and provide it to the voice skill 147, which can monitor the sound detected by the voice-activated device 106. The voice skill 147 can identify the session extension code 160 from the ultrasonic pulse 179 and transmit a session extension code verification request 177 to the workflow service 120. The workflow service 120 can determine whether the session extension code 160 is verified or unverified, for example, by determining whether it was generated by an expected code generation algorithm or shared secret. In some cases, the workflow service 120 can provide the results of this verification to the voice-activated device 106, and can direct the voice skill 147 to end or extend the current voice skill session.

The operating system 145 of the voice-activated device 106 can execute various client functionalities or voice skills 147. The operating system 145 and some voice skills 147 can access network content served up by the computing environment 103, or other servers including the network services 104, and can present this information to a user through an audio device, and can provide haptic or physical feedback using a haptic device. The operating system 145 of the voice-activated device 106, as a security precaution, can suspend, pause, stop, close, kill or otherwise interrupt the voice skill 147 or the voice skill session after a security time period. This can ensure that the voice skill 147, or the authenticated session does not remain in use perpetually. This can prevent one user from authenticating a session, leaving the area, and another user gaining access to the voice skill 147. The silence threshold time 150 can be selected to be shorter than the security time period of the operating system 145, so that the session extension process can be completed before the operating system 145 acts to interrupt the voice skill 147 or the voice skill session.

Some applications 157 can include a browser or a dedicated application, and a user interface can include a network page, an application screen, or other interface. The voice-activated device 106 can also access web applications using the browser application. Further, other applications 157 can include device management applications, enterprise applications, social networking applications, word processors, spreadsheet applications, media player applications, or other applications. The workflow application 159 can be an application that performs certain functions in concert with the workflow service 120. The workflow application 159 can perform actions as directed by the workflow service 120, for instance, by checking in with the workflow service 120, retrieving a command from the command queue, and implementing the command as discussed above.

The personal client device 109 can be representative of one or more personal client devices 109. The personal client device 109 can include a processor-based system, such as a computer system, that can include a laptop computer, a personal digital assistant, a cellular telephone, a smartphone, a music player, a tablet computer system, a game console, an electronic book reader, a smartwatch, a voice-activated smart device, or any other device with like capability. The personal client device 109 can be mobile such that a user is likely to keep the personal client device 109 close at hand. In other words, the personal client device 109 can be a device that is likely to be in the presence of the user. The personal client device 109 can have an operating system that can perform functionalities and execute applications. The operating system 155 can be stored in a data store 153 that also includes applications 157, a workflow application 159, a session extension code 160, and other data. The personal client device 109 can execute the workflow application 159 to perform or access the functionality described for the workflow service 120. The personal client device 109 can be equipped with networking capability or networking interfaces, including a localized networking or communication capability, such as a near-field communication (NFC) capability, radio-frequency identification (RFID) read or write capability, or other localized communication capability. In some embodiments, the personal client device 109 is mobile where the personal client device 109 is easily portable from one location to another, such as a smart phone, tablet, or laptop computer.

The operating system 155 of the personal client device 109 can execute various client functionalities or client applications 157, such as a workflow application 159, a browser application, a voice interaction functionality, or another application. The operating system 155 and some applications 157 can access network content served up by the computing environment 103, or other servers and can present this information to a user through one or more of the user interface devices. For example, the personal client device 109 can render a user interface on a display, such as a liquid crystal display (LCD), organic light emitting diode (OLED) display, touch-screen display, or other type of display device. The personal client device 109 can also present audio information using the audio device, and can provide haptic or physical feedback using a haptic device.

Some applications 157 can include a browser or a dedicated application, and a user interface can include a network page, an application screen, or other interface. The personal client device 109 can also access web applications using the browser application. Further, other applications 157 can include device management applications, enterprise applications, social networking applications, word processors, spreadsheet applications, media player applications, or other applications. The workflow application 159 can be an application that performs certain functions in concert with the workflow service 120. The workflow application 159 can perform actions as directed by the workflow service 120, for instance, by checking in with the workflow service 120, retrieving a command from the command queue, and implementing the command as discussed above.

The workflow application 159 can perform actions using the personal client device 109 to facilitate workflows managed by the workflow service 120. The workflow application 159 can communicate with the workflow service 120. For example, the workflow application 159 can receive an ultrasonic pulse command 175. The workflow application 159, or the workflow service 120, can generate unique one time passwords (OTPs), time-based OTPs (TOTPs) or other unique and identifiable session extension codes 160. In some cases, the workflow application 159 can generate a session extension code 160 using a shared secret that is shared or otherwise known by the workflow service 120. The workflow application 159 can encrypt the session extension code 160 using symmetrical encryption, where the shared secret can be fed to a key derivation function to produce keys for encryption of the session extension code 160. The workflow service 120 can then verify that the origin of the session extension code 160 is the personal client device 109 based on the shared secret. The shared secret can include a password, a random or pseudorandom number, an array of random or pseudorandom bytes, or another structure that is shared between the workflow application 159 and the workflow service 120.

The periodic threshold time 161 can represent a period of time between ultrasonic pulses 179. For example, the workflow application 159 can receive an ultrasonic pulse command 175 that indicates the workflow application 159 should periodically emit an ultrasonic pulse 179. The periodic threshold time 161 can be a predetermined time period shorter than the security time period of the operating system 145 of the voice-activated device 106. The workflow application 159 can, at an interval of the periodic threshold time 161, generate a session extension code 160, and emit an ultrasonic pulse 179 that includes the session extension code 160.

Figure 2:
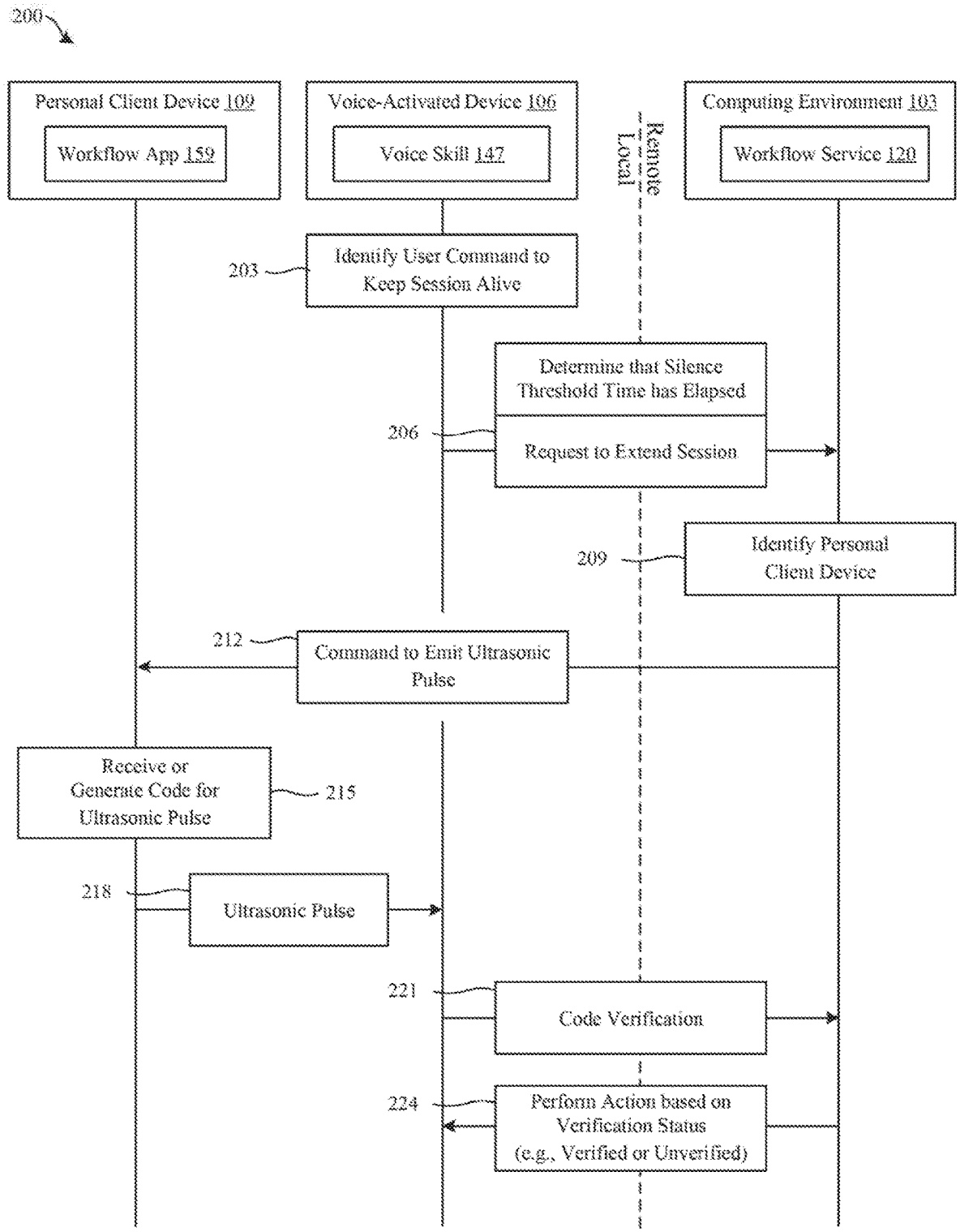
FIG. 2 is a sequence diagram outlining functionalities implemented by the workflow service and other components of the networked environment.

FIG. 2 shows an example sequence diagram 200 describing steps that can be performed by the components of the networked environment 100. Generally, the sequence diagram 200 describes a process for securely extending a session of the voice skill 147 using the voice-activated device 106, the workflow service 120, the personal client device 109, and other components of the networked environment 100.

A user can authenticate a voice skill session of the voice skill 147 on the voice-activated device 106. In some cases, this can be accomplished using the authentication credentials 133, or other credentials. The workflow service 120 can also automatically handle authentication with a network service 104 utilized by the voice skill 147. The operating system 145 can provide audio detected by the voice-activated device 106 to the voice skill 147. The voice skill 147 can monitor this audio data for predetermined voice commands. The voice skill 147 can also monitor this audio data to provide other functionalities such as natural language transcription.

In step 203, the voice skill 147 can identify the user command to extend the voice skill session or keep the session alive. For example, the user can issue a command to keep the voice skill session alive by speaking a natural language voice command in proximity to the voice-activated device 106. In some cases, the command can specify the personal client device 109 to utilize to keep the session alive. The personal client device 109 can be a device that is kept on the user's person or is otherwise kept in close proximity to the user.

Alternatively, the workflow application 159 can identify the user command to extend the voice skill session or keep the session alive. The user can navigate a user interface of the personal client device 109 and select a user interface element that indicates that the voice skill session of the voice skill 147 on the voice-activated device 106 should be kept alive or extended. Such a command can include a unique device identifier of the personal client device 109, a unique device identifier of the voice-activated device 106, and the voice skill 147. The workflow application 149 can transmit this information to the workflow service 120.

In step 206, the voice skill 147 can transmit a session extension request 173 to the workflow service 140. The session extension request 173 can include a unique device identifier of the personal client device 109. The voice skill 147 can identify the unique device identifier based on a predetermined device name spoken by the user, and include the unique device identifier in the session extension request 173. In some cases, the voice skill 147 can determine that a silence threshold time 150 has elapsed, and can transmit a session extension request 173 to the workflow service 140 in response to determining that the silence threshold time 150 has elapsed. In other cases, the voice skill 147 can transmit a session extension request 173 to the workflow service 140 immediately.

For example, if the voice skill 147 drives or controls the session extension process, the voice skill 147 can track the silence threshold time 150 and transmit session extension requests 173 each time the silence threshold time 150 has elapsed. In that example, each ultrasonic pulse emitted by the personal client device 109 can be initiated by a corresponding session extension request 173 to the workflow service 140. Alternatively, if the voice skill 147 does not track the silence threshold time 150, the voice skill 147 can transmit a session extension request 173 to the workflow service 140 at any time. The personal client device 109 or the workflow service 120 controls the timing and emissions of ultrasonic pulses 179.

In step 209, the workflow service 120 can identify a personal client device 109. As indicated above, the session extension request 173 can include a unique device identifier of the personal client device 109. The workflow service 120 can also identify the personal client device 109 based on the unique device identifier of the session extension request 173. The workflow service 120 can also identify the personal client device 109 based on a user account 129. The user account 129 can be identified based on the credentials used to authenticate the voice skill session with the workflow service 120. The user account 129 can specify that the personal client device 109 is registered to the same user that authenticated the voice skill session. The workflow service 120 can also identify multiple registered devices, and select the personal client device 109 by filtering the devices based on a device type such as mobile phone, smartwatch, or other preferred device types that are likely to be kept in proximity of the user. The personal client device 109 can also be user-selected in advance and can be identified in the user account 129 for extending voice skill sessions.

In step 212, the workflow service 120 can transmit an ultrasonic pulse command 175 to the personal client device 109. The ultrasonic pulse command 175 can include a session extension code 160 generated by the workflow service 120. The ultrasonic pulse command 175 can be a single command for a single ultrasonic pulse. The ultrasonic pulse command 175 can also specify that the personal client device 109 should emit a pulse at a specified time period. The ultrasonic pulse command 175 can be referred to as a session extension pulse command, and the ultrasonic pulse 179 can be referred to as a session extension pulse. The workflow application 159 can receive the ultrasonic pulse command 175.

In step 215, the workflow application 159 can receive or generate a session extension code 160 for an ultrasonic pulse 179. The session extension code 160 can be received from the workflow service 120 in the ultrasonic pulse command 175. If the workflow service 120 generates that session extension code 160, the workflow service 120 can verify the authenticity of a session extension code 160 that is received from the voice-activated device 106 based on the expected session extension code 160 that is generated.

The workflow application 159 can also generate a session extension code 160. For example, the workflow application 159 can generate the session extension code 160 using a shared secret that is shared or otherwise known by the workflow service 120. The workflow application 159 can encrypt the session extension code 160 using symmetrical encryption, where the shared secret can be fed to a key derivation function to produce keys for encryption of the session extension code 160. Since the workflow service 120 has access to the shared secret, the workflow service 120 can verify the authenticity of the session extension code 160 that is received from the voice-activated device 106 based on the shared secret and without receiving the actual session extension code 160.

Alternatively, the workflow application 159 can generate and transmit the session extension code 160 electronically to the workflow service 120. The workflow service 120 can verify the authenticity of a session extension code 160 that is received from the voice-activated device 106 based on an expected session extension code 160 that is received from the personal client device 109. The workflow application 159 can periodically receive or generate another session extension code 160 for another ultrasonic pulse 179.

In step 218, the workflow application 159 can cause the personal client device 109 to generate and emit the ultrasonic pulse 179. The ultrasonic pulse 179 can be emitted from a speaker or audio device of the personal client device 109. The workflow application 159 can embed the session extension code 160 within the ultrasonic pulse 179. The ultrasonic pulse 179 can be inaudible to the user, but nevertheless detectable by the voice-activated device 106. For example, the ultrasonic pulse 179 can be outside of the human audible frequency range of about 20 Hz to about 20 kHz. While referred to as an ultrasonic pulse 179, the pulse can also include infrasonic pulses at frequencies lower than the human audible range, or any inaudible pulse.

In step 221, the voice skill 147 can transmit a session extension code verification request 177 to the workflow service 120. For example, a microphone or audio input device of the voice-activated device 106 can detect the ultrasonic pulse 179. The operating system 145 of the voice-activated device 106 can forward the ultrasonic pulse 179 to the voice skill 147. The voice skill 147 can extract the session extension code 160 from the ultrasonic pulse 179, and transmit the session extension code verification request 177 to the workflow service 120. The session extension code verification request 177 can include the session extension code 160.

In step 224, the workflow service 120 can perform an action based on a verification status of the session extension code 160. Actions performed by the workflow service 120 can include storing the verification status, incrementing or resetting a counter for a number of unverified session extension codes 160, transmitting the verification status to the voice-activated device 106 and the personal client device 109, transmitting a command for the voice-activated device 106 to extend or cancel the voice skill session to, and transmitting a command for the personal client device 109 to continue or discontinue emitting ultrasonic pulses.

The workflow service 120 can determine whether the session extension code 160 is verified or is unverified. If the session extension code 160 is verified, in some cases the workflow service 120 can store the verification status with no further action. For example, if the ultrasonic pulse 179 is sufficient to restart the internal silence or quiet time counter of the operating system 145. In other cases, the workflow service 120 can transmit a "verified" verification status to the voice skill 147. The voice skill 147 can extend the voice skill session based on the verification status indicating that the session extension code 160 is verified.

An unverified session extension code 160 can indicate that malicious behavior has occurred. The workflow service 120 can transmit an "unverified" verification status to the voice skill 147, and the voice skill 147 can end the voice skill session. In some cases, the "unverified" verification status can be included in a command to end the voice skill session. In order to prevent false positives with respect to malicious behavior, the workflow service 120 or the voice skill 147 can wait until a predetermined number of session extension codes 160 are unverified before ending the voice skill session or transmitting a command to end the voice skill session.

Figure 3:
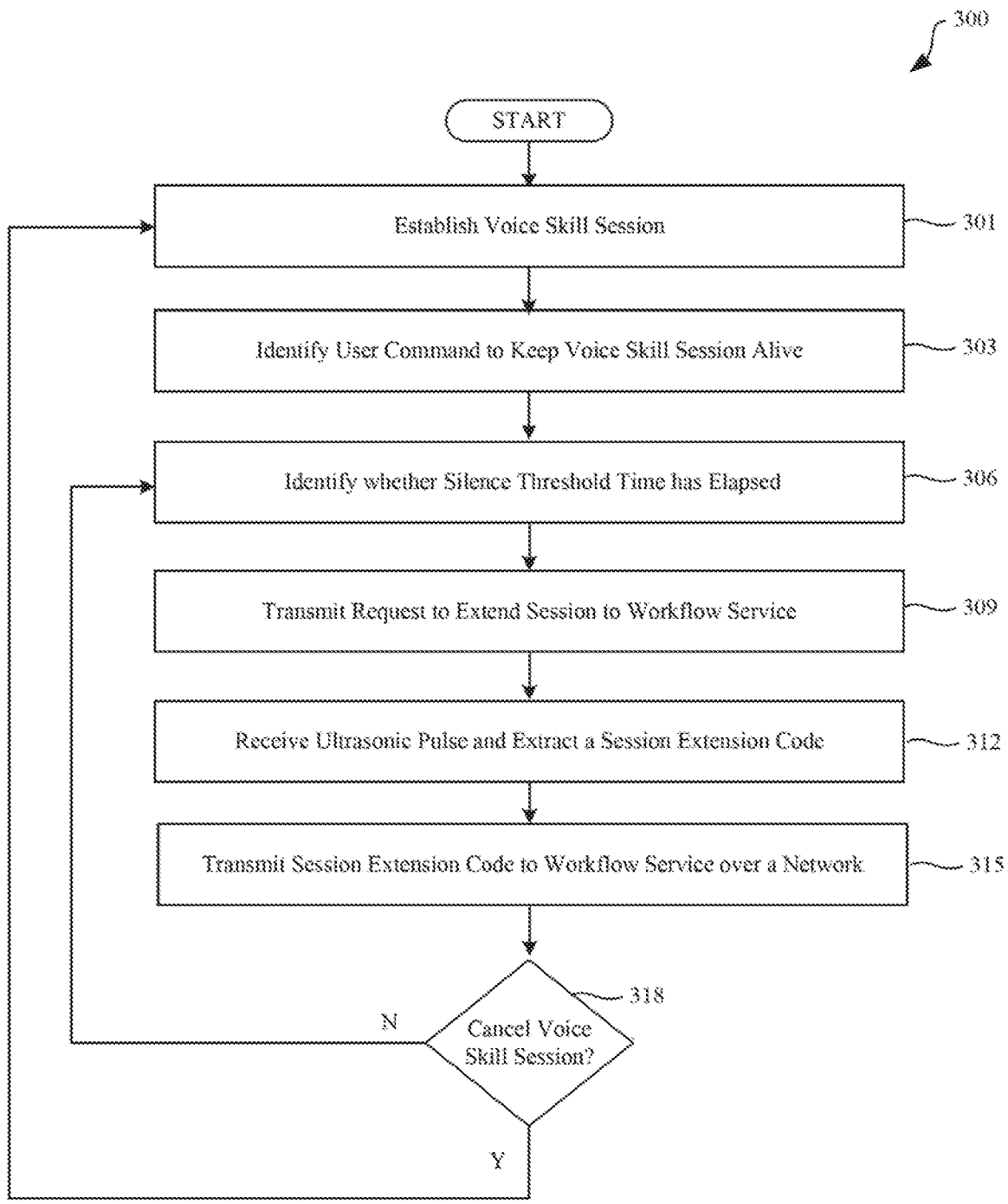
FIG. 3 is a flowchart outlining functionalities implemented by the voice-activated device and other components of the networked environment.

FIG. 3 shows an example flowchart 300 describing steps that can be performed by the voice skill 147. The flowchart 300 outlines how the voice skill 147 interacts with the other components of the networked environment 100 to securely extend a voice skill session.

In step 301, a voice skill 147 can establish a voice skill session on the voice-activated device 106. A user can launch the voice skill 147, and start a voice skill session of the voice skill 147. This can include authenticating using the authentication credentials 133 or other credentials. The workflow service 120 can also automatically handle authentication with a network service 104 utilized by the voice skill 147 to establish the voice skill session.

In step 303, the voice skill 147 can identify a user command to keep the session alive. The operating system 145 can provide audio detected by the voice-activated device to the voice skill 147. The voice skill 147 can monitor this audio data for predetermined voice commands. The voice skill 147 can also monitor this audio data to provide other functionalities such as natural language transcription. The user can issue a command to keep the voice skill session alive. The user can speak a natural language voice command in proximity to the voice-activated device 106. In some cases, the command can specify the personal client device 109 to utilize to keep the session alive. For example, the user can speak a predetermined device name that is voice recognizable, and the voice skill 147 can identify a unique device identifier of the personal client device 109 based on the predetermined device name.

In step 306, the voice skill 147 can determine that a silence threshold time 150 has elapsed. The voice skill 147 can monitor audio that is detected by a microphone or audio input device of the voice-activated device 106 and forwarded to the voice skill 147. The voice skill 147 can track silent or quiet periods to determine that the silence threshold time 150 has elapsed. The operating system 145 of the voice-activated device 106, as a security precaution, can suspend, pause, stop, close, kill or otherwise interrupt the voice skill 147 or the voice skill session after a security time period. The silence threshold time 150 can be selected to be shorter than the security time period of the operating system 145, so that the session extension process can be completed before the operating system 145 acts to interrupt the voice skill 147 or the voice skill session. However, in some modes of operation as discussed, the voice skill 147 does not track silence threshold time 150. For example, where the workflow service 120 or the personal client device 109 drive the session extension process, the voice skill 147 may not track silence threshold time 150.

In step 309, the voice skill 147 can transmit a session extension request 173 to the workflow service 140. For example, where the voice skill 147 drives or controls the session extension process, the voice skill 147 can track the silence threshold time 150 and transmit session extension requests 173 each time the silence threshold time 150 has elapsed. In that situation, each ultrasonic pulse emitted by the personal client device 109 can be initiated by a corresponding session extension request 173 to the workflow service 140. Alternatively, if the voice skill 147 does not track the silence threshold time 150, the voice skill 147 can transmit a session extension request 173 to the workflow service 140 at any time, and the workflow service 120 or the workflow application 149 can drive the session extension process. In other words, the personal client device 109 or the workflow service 120 can control the timing and emissions of ultrasonic pulses 179.

The session extension request 173 can include a unique device identifier of the personal client device 109. The voice skill 147 can identify the unique device identifier based on a predetermined device name spoken by the user, and include the unique device identifier in the session extension request 173. The session extension request 173 can also include a unique device identifier of the voice-activated device 106, and a unique identifier of a user or user account 129. The unique identifier of a user or user account 129 can include authentication credentials, such as a username, account name, password, and other credentials.

In step 312, the voice skill 147 can receive an ultrasonic pulse 179 and extract a session extension code 160. A microphone or audio input device of the voice-activated device 106 can detect the ultrasonic pulse 179 emitted from the personal client device 109. The operating system 145 of the voice-activated device 106 can forward the ultrasonic pulse 179 to the voice skill 147. The voice skill 147 can extract the session extension code 160 from the ultrasonic pulse 179.

In step 315, the voice skill 147 can transmit a session extension code verification request 177 to the workflow service 120 over a network. The session extension code verification request 177 can include the session extension code 160 extracted from the ultrasonic pulse 179.

In step 318, the voice skill 147 can determine whether to cancel or extend the voice skill session. The voice skill 147 can determine actions to take based on a verification status of the session extension code 160. If the voice skill 147 determines to cancel the voice skill session, the process can move to step 301 and wait for the user to establish a new voice skill session. If the voice skill 147 determines to extend the voice skill session, the process can move to step 306 and wait for a silence threshold time to elapse, for another ultrasonic pulse 179, or for instruction from the workflow service 120.

The voice skill 147 can also determine actions to take based on whether an ultrasonic pulse 179 has been received within a specified time period, such as the periodic threshold time 161. To this end, in some examples, the data store 143 also include the periodic threshold time 161. If at any point, the ultrasonic pulses 179 cease to be received, the voice skill 147 can determine that the user and the client device 109 has left a vicinity of the voice-activated device 106. The voice skill 147 can cancel or end the voice skill session immediately, including before the end of the silence threshold time 150 and the security time counter of the operating system 145.

In some cases, receiving the audio from the ultrasonic pulse 179 is sufficient to reset the security time counter of the operating system 145, and reset a counter of the voice skill 147 for the silence threshold time 150. However, in other cases these counters may not be reset unless a sound in the human audible range or human vocal range is detected. If the session extension code 160 is verified, the voice skill 147 can receive a verified status or a command to extend the voice skill session from the workflow service 120. The voice skill 147 can also request that the operating system 145 extends the voice skill session. However, if the session extension code 160 is unverified, the voice skill 147 can receive an unverified status or a command to end the voice skill session. In order to prevent false positives with respect to malicious behavior, the workflow service 120 or the voice skill 147 can wait until a predetermined number of session extension codes 160 are unverified before ending the voice skill session. Actions performed by the workflow service 120 can also include storing the verification status, and incrementing or resetting a counter for a number of consecutive unverified session extension codes 160.

Figure 4:
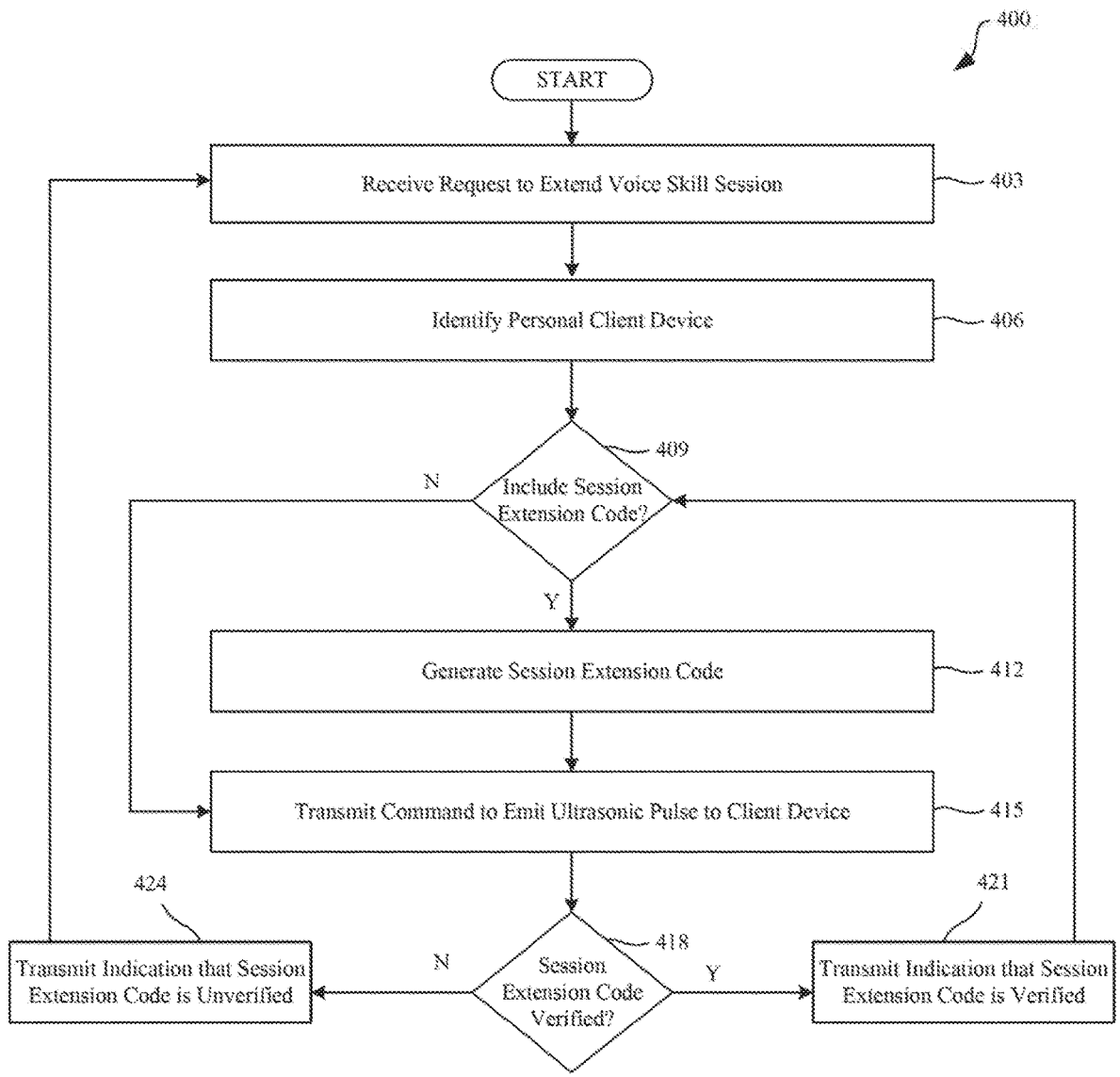
FIG. 4 is a flowchart outlining functionalities implemented by the workflow service and other components of the networked environment.

FIG. 4 shows an example flowchart 400 describing steps that can be performed by the workflow service 120. The flowchart 400 outlines how the workflow service 120 interacts with the other components of the networked environment 100 to securely extend a voice skill session.

In step 403, the workflow service 120 can receive a session extension request 173 to extend a voice skill session with the voice skill 147. The workflow service 120 can receive the session extension request 173 from a voice-activated device 106 or a personal client device 109. The session extension request 173 can embed data including an account identifier of the user account 129, a unique device identifier of the personal client device 109, a unique device identifier of the voice-activated device 106, and an identifier of the voice skill 147.

In step 406, the workflow service 120 can identify a personal client device 109. The personal client device 109 can be identified based on any of the data included in the session extension request 173. The workflow service 120 can analyze the information embedded in the session extension request 173 to identify a user account 129, and can identify the personal client device 109 based on the user account 129. The user account 129 can also be identified based on the credentials used to authenticate the voice skill session with the workflow service 120. For example, the user account 129 can specify that the personal client device 109 is registered to the same user that authenticated the voice skill session. The workflow service 120 can also identify multiple registered devices, and select the personal client device 109 by filtering the devices based on a device type such as mobile phone, smartwatch, or other preferred device types that are likely to be kept in proximity of the user. The personal client device 109 can also be user-selected in advance and can be identified in the user account 129 for extending voice skill sessions.

In step 409, the workflow service 120 can determine whether to include a session extension code 160 in the ultrasonic pulse command 175. The workflow service 120 can make this determination based on a predetermined mode of operation for session extension. If the workflow service 120 is to include a session extension code 160 in the ultrasonic pulse command 175, the process can proceed to step 412. If the workflow service 120 does not include the session extension code 160, the process can proceed to step 415.

In step 412, the workflow service 120 can generate a session extension code 160. The session extension code 160 can be a time-based TOTP that expires after a predetermined time, or any type of session extension code 160 as discussed. The workflow service 120 can include a code algorithm, and can generate the session extension code 160 using this algorithm.

In step 415, the workflow service 120 can transmit an ultrasonic pulse command 175 to the personal client device 109 over a network 112. The ultrasonic pulse command 175 can be a single command for a single ultrasonic pulse 179. Alternatively, the ultrasonic pulse command 175 can specify that the personal client device 109 should emit a pulse at a specified time period. The ultrasonic pulse command 175 can also be referred to as a session extension pulse command, and the ultrasonic pulse 179 can be referred to as a session extension pulse. The workflow application 159 can receive the ultrasonic pulse command 175. In some examples, the ultrasonic pulse command 175 can include the session extension code 160 generated by the workflow service 120. Otherwise, the ultrasonic pulse command 175 can cause the workflow application 159 to generate the session extension code 160.

In step 418, the workflow service 120 can determine whether the session extension code 160 is verified or unverified. If the session extension code 160 is verified, the process can move to step 421. If the session extension code 160 is unverified, the workflow service 120 can move to step 424.

In step 421, the workflow service 120 can transmit a verification status indicating that the session extension code 160 is verified. The workflow service 120 can transmit the verified status to the voice-activated device 106 as well as the personal client device 109. The workflow service 120 can transmit the verified status to the voice-activated device 106 with a command to extend the voice skill session. The workflow service 120 can transmit the verified status to the personal client device 109 with a command to continue emitting ultrasonic pulses 179 to keep the voice skill session alive. The process can then move to step 409 and proceed according to the identified mode of operation.

In step 424, the workflow service 120 can transmit a verification status indicating that the session extension code 160 is unverified. The workflow service 120 can transmit the unverified status to the voice-activated device 106 as well as the personal client device 109. The workflow service 120 can transmit the unverified status to the voice-activated device 106 with a command to extend the voice skill session. The workflow service 120 can transmit the unverified status to the personal client device 109 with a command to discontinue emitting ultrasonic pulses 179. The process can then move to step 403 and wait for a request to extend another voice skill session.

Figure 5:
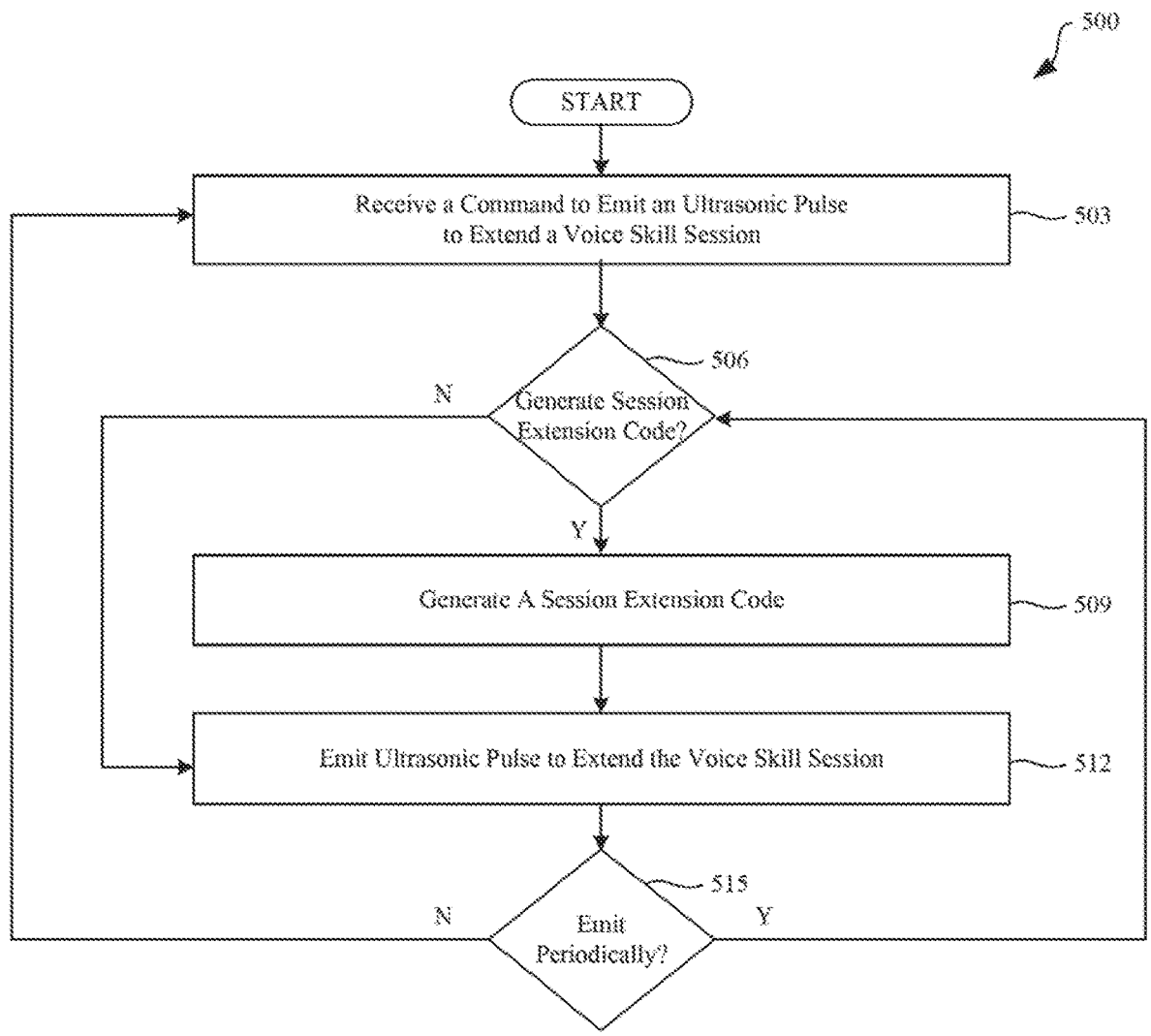
FIG. 5 is another flowchart outlining functionalities implemented by the personal client device and other components of the networked environment.

FIG. 5 shows an example flowchart 500 describing steps that can be performed by the workflow application 159 of the personal client device 109. The flowchart 500 outlines how the workflow application 159 interacts with the other components of the networked environment 100 to securely extend a voice skill session.

In step 503, the workflow application 159 can receive a command or request to emit an ultrasonic pulse 179 to extend a voice skill session. An ultrasonic pulse command 175 can be received from the workflow service 120. The ultrasonic pulse command 175 can include a session extension code 160 generated by the workflow service 120. The ultrasonic pulse command 175 can be a single command for a single ultrasonic pulse 179. Alternatively, the ultrasonic pulse command 175 can cause the workflow application 159 to initiate an ultrasonic pulse 179 periodically at a specified time period.

In step 506, the workflow application 159 can determine whether to generate a session extension code 160. For example, if the ultrasonic pulse command 175 includes a session extension code 160, or indicates to omit generation of a session extension code 160, then the workflow application 159 can proceed to step 512. If the ultrasonic pulse command 175 omits a session extension code 160 or indicates to generate a session extension code 160, then the workflow application 159 can proceed to step 509.

In step 509, the workflow application 159 can generate a session extension code 160 using a shared secret that is shared with the workflow service 120. The workflow service 120 can then verify authenticity of a session extension code 160 based on the shared secret. The workflow application 159 can encrypt the session extension code 160 using symmetrical encryption, where the shared secret can be fed to a key derivation function to produce keys for encryption of the session extension code 160.

Alternatively, the workflow application 159 can generate a one-time code such as a random, pseudorandom, algorithmic, or any session extension code 160. The workflow service 120 can verify authenticity of a session extension code 160 received in the session extension code verification request 177 by comparison with the session extension code 160 received from the workflow application 159.

In step 512, the workflow application 159 can cause the personal client device 109 to generate and emit the ultrasonic pulse 179. The ultrasonic pulse 179 can be emitted from a speaker or audio device of the personal client device 109. The workflow application 159 can embed the session extension code 160 within the ultrasonic pulse 179. The ultrasonic pulse 179 can be inaudible to the user, but nevertheless detectable by the voice-activated device 106.

In step 515, the workflow application 159 can determine whether to emit an ultrasonic pulse 179 periodically. For example, the ultrasonic pulse command 175 can include instructions to initiate an ultrasonic pulse 179 periodically at a specified time period, such as the periodic threshold time 161. The periodic threshold time 161 can be included in the workflow application 159, predetermined, or included in the ultrasonic pulse command 175. If the workflow application 159 determines that an ultrasonic pulse 179 should be emitted periodically, the workflow application 159 can proceed to steps 506 through 512, and emit ultrasonic pulses at the periodic threshold time 161. Otherwise, the ultrasonic pulse command 175 can include instructions to initiate a single ultrasonic pulse 179, and the workflow application 159 can proceed to step 503.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The personal client devices 109 can include a display upon which a user interface generated by an application 157, workflow application 159, workflow service 120, or another application can be rendered. In some examples, the user interface can be generated with user interface data provided by the computing environment 103. The personal client devices 109 can also include one or more input/output devices that can include, for example, a capacitive touchscreen or other type of touch input device, fingerprint reader, or keyboard.

Although the workflow service 120, client applications 157, workflow application 159, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system, comprising:
   at least one computing device comprising at least one processor; and
   at least one memory comprising executable instructions, wherein the instructions, when executed by the at least one processor, cause the at least one computing device to at least:
   receive, by a workflow service executed by at least one server device, a session extension request from a voice skill on a voice-activated device to extend a voice skill session of the voice-activated device;
   identify, by the workflow service, a personal client device based on the session extension request;
   transmit, by the workflow service to the personal client device, a command comprising instructions that instruct a workflow application executed by the personal client device to:
     generate a session extension code using an expected code generation algorithm expected by the workflow service; and
     periodically emit an ultrasonic pulse to extend the voice skill session of the voice-activated device at a specified time period, wherein the specified time period is selected to be shorter than a security time period of an operating system of the voice-activated device, the ultrasonic pulse comprising the session extension code to be extracted by the voice skill on the activated voice-activated device;
   receive, by the workflow service from the voice-activated device, the session extension code extracted from the ultrasonic pulse by the voice-activated device;
   identify a verification status based on determining that the session extension code is generated using the expected code generation algorithm; and
   perform, by the workflow service, an action based on the identified verification status.

2. The system of claim 1, wherein the session extension request specifies the personal client device to extend the voice skill session.

3. The system of claim 1, wherein the personal client device is identified further based on a user account that specifies the personal client device to extend the voice skill session.

4. The system of claim 1, wherein the action comprises at least one of:
   incrementing a counter for a number of unverified session extension codes, resetting the counter for the number of unverified session extension codes, transmitting the verification status to the voice-activated device and the personal client device, transmitting a command for the voice-activated device to extend or cancel the voice skill session, and transmitting a command for the personal client device to continue or discontinue emitting ultrasonic pulses.

5. The system of claim 1, wherein the session extension code is generated based in further part on a shared secret that is shared between
   the workflow service and the personal client device, wherein the shared secret is used to encrypt the session extension code.

6. The system of claim 5, wherein the verification status is determined based on the session extension code extracted from the ultrasonic pulse and the shared secret.

7. The system of claim 1, wherein the verification status is determined based on the session extension code extracted from the ultrasonic pulse and an expected session extension code.

8. A non-transitory computer-readable medium comprising executable instructions, wherein the instructions, when executed by at least one processor, cause at least one computing device to at least:
   receive, by a workflow service executed by at least one server device, a session extension request from a voice skill on a voice-activated device to extend a voice skill session of the voice-activated device;
   identify, by the workflow service, a personal client device based on the session extension request;
   transmit, by the workflow service to the personal client device, a command comprising instructions that instruct a workflow application executed by the personal client device to:
   generate a session extension code using an expected code generation algorithm expected by the workflow service; and
   periodically emit an ultrasonic pulse to extend the voice skill session of the voice-activated device at a specified time period selected to be shorter than a security time period of an operating system of the voice-activated device, the ultrasonic pulse comprising the session extension code to be extracted by the voice skill on the activated voice-activated device;
   receive, by the workflow service from the voice-activated device, the session extension code extracted from the ultrasonic pulse by the voice-activated device;
   identify a verification status based on determining that the session extension code is generated using the expected code generation algorithm; and perform, by the workflow service, an action based on the identified verification status.

9. The non-transitory computer-readable medium of claim 8, wherein the session extension request specifies the personal client device to extend the voice skill session.

10. The non-transitory computer-readable medium of claim 8, wherein the personal client device is identified further based on a user account that specifies the personal client device to extend the voice skill session.

11. The non-transitory computer-readable medium of claim 8, wherein the action comprises at least one of:
    incrementing a counter for a number of unverified session extension codes, resetting the counter for the number of unverified session extension codes, transmitting the verification status to the voice-activated device and the personal client device, transmitting a command for the voice-activated device to extend or cancel the voice skill session, and transmitting a command for the personal client device to continue or discontinue emitting ultrasonic pulses.

12. The non-transitory computer-readable medium of claim 8, wherein the session extension code is generated based in further part on a shared secret that is shared between the workflow service and the personal client device, wherein the shared secret is used to encrypt the session extension code.

13. The non-transitory computer-readable medium of claim 12, wherein the verification status is determined based on the session extension code extracted from the ultrasonic pulse and the shared secret.

14. The non-transitory computer-readable medium of claim 8, wherein the verification status is determined based on the session extension code extracted from the ultrasonic pulse and an expected session extension code.

15. A method performed by at least one computing device based on instructions executed by at least one processor of the at least one computing device, the method comprising:
    receiving, by a workflow service executed by at least one server device, a session extension request from a voice skill on a voice-activated device to extend a voice skill session of the voice-activated device;
    identifying, by the workflow service, a personal client device based on the session extension request;
    transmitting, by the workflow service to the personal client device, a command comprising instructions that instruct a workflow application executed by the personal client device to:
        generate a session extension code using an expected code generation algorithm expected by the workflow service; and
        periodically emit an inaudible ultrasonic pulse to extend the voice skill session of the voice-activated device at a specified time period selected to be shorter than a security time period of an operating system of the voice-activated device, the inaudible ultrasonic pulse comprising the session extension code to be extracted by the voice skill on the voice-activated device;
    receiving, by the workflow service from the voice-activated device, the session extension code extracted from the inaudible ultrasonic pulse by the voice-activated device;
    identifying a verification status based on determining that the session extension code is generated using the expected code generation algorithm; and
    performing, by the workflow service, an action based on the identified verification status.

16. The method of claim 15, wherein the session extension request specifies the personal client device to extend the voice skill session.

17. The method of claim 15, wherein the personal client device is identified further based on a user account that specifies the personal client device to extend the voice skill session.

18. The method of claim 15, wherein the action comprises at least one of:
    incrementing a counter for a number of unverified session extension codes, resetting the counter for the number of unverified session extension codes, transmitting the verification status to the voice-activated device and the personal client device, transmitting a command for the voice-activated device to extend or cancel the voice skill session, and transmitting a command for the personal client device to continue or discontinue emitting inaudible ultrasonic pulses.

19. The method of claim 15, wherein the session extension code is generated based in further part on a shared secret that is shared between the workflow service and the personal client device, wherein the shared secret is used to encrypt the session extension code.

20. The method of claim 19, wherein the verification status is determined based on the session extension code extracted from the inaudible ultrasonic pulse and the shared secret.

* * * * *